United States Patent
Hao et al.

(10) Patent No.: US 12,435,038 B2
(45) Date of Patent: Oct. 7, 2025

(54) AMLODIPINE MESYLATE MONOHYDRATE PREPARATION METHOD THEREFOR AND USE THEREOF

(71) Applicant: KUNMING SINOWAY NATURAL PHARMACEUTICALS CO., LTD., Kunming (CN)

(72) Inventors: Zhenping Hao, Kunming (CN); Li Xu, Kunming (CN)

(73) Assignee: KUNMING SINOWAY NATURAL PHARMACEUTICALS CO., LTD., Kunming (CN)

( * ) Notice: Subject to any disclaimer, the term of this patent is extended or adjusted under 35 U.S.C. 154(b) by 636 days.

(21) Appl. No.: 17/756,619

(22) PCT Filed: Dec. 9, 2019

(86) PCT No.: PCT/CN2019/123972
§ 371 (c)(1),
(2) Date: May 27, 2022

(87) PCT Pub. No.: WO2021/114012
PCT Pub. Date: Jun. 17, 2021

(65) Prior Publication Data
US 2023/0023131 A1 Jan. 26, 2023

(51) Int. Cl.
*C07D 211/90* (2006.01)
*A61K 9/20* (2006.01)

(52) U.S. Cl.
CPC .......... *C07D 211/90* (2013.01); *A61K 9/2013* (2013.01); *A61K 9/2054* (2013.01); *A61K 9/2059* (2013.01); *C07B 2200/13* (2013.01)

(58) Field of Classification Search
CPC .. C07D 211/90; C07D 211/86; A61K 9/2013; A61K 9/2054; A61K 9/2059; A61K 31/4418; A61K 31/4422; C07B 2200/13; A61P 9/00; A61P 9/12
See application file for complete search history.

(56) References Cited

FOREIGN PATENT DOCUMENTS

| CN | 1263093 A | * | 8/2000 |
| EP | 1 221 438 A2 | | 7/2002 |
| WO | WO 2004/096770 A1 | | 11/2004 |

OTHER PUBLICATIONS

Belviso, B.D. (2016). Crystal Seeding. In: Drioli, E., Giorno, L. (eds) Encyclopedia of Membranes (Year: 2016).*
Santl, et al., "A compressibility and compactibility study of real tableting mixtures: the effect of granule particle size," Acta Pharmaceutica, vol. 62, No. 3, Nov. 6, 2012, pp. 325-340.
Wang, et al., "Recent Update of Studies on Powder Characterization," Chinese Journal of New Drugs, vol. 15, No. 18, Sep. 23, 2006, pp. 1535-1539, with English translation.
International Search Report of PCT/CN2019/123972, Sep. 9, 2020, 5 pages.
International Written Opinion of PCT/CN2019/123972, Sep. 9, 2020, 6 pages.
Wang, et al., "Recent Updates of Studies on Powder Characterization," Chinese Journal of New Drugs, vol. 15, No. 18, Sep. 23, 2006, pp. 1535-1539 (On Order).
Santl, et al., "A compressibility and compactibility study of real tableting mixtures: the effect of granule particle size," Acta Pharmaceutica, vol. 62, No. 3, Nov. 6, 2012, pp. 325-340 (On Order).

* cited by examiner

*Primary Examiner* — Frederick F Krass
*Assistant Examiner* — Abdulrahman Abbas
(74) *Attorney, Agent, or Firm* — Lewis Roca Rothgerber Christie LLP

(57) ABSTRACT

Amlodipine mesylate monohydrate, a preparation method therefor and a use thereof. The described amlodipine mesylate monohydrate has high purity, has good fluidity and compressibility, and is suitable for direct tableting processing by a high-speed tablet press.

15 Claims, 8 Drawing Sheets

2θ

AMLODIPINE MESYLATE MONOHYDRATE PREPARATION METHOD THEREFOR AND USE THEREOF

CROSS-REFERENCE TO RELATED APPLICATION(S)

This application is a U.S. National Phase Patent Application and claims priority to International Application Number PCT/CN2019/123972, filed on Dec. 9, 2019, the entire content of which is incorporated herein by reference.

TECHNICAL FIELD

The present invention relates to the field of pharmaceutical preparation, and in particular to an amlodipine mesylate monohydrate, preparation method therefor and use thereof.

BACKGROUND OF THE INVENTION

Most of drugs are weakly acidic or weakly alkaline organic molecules. Among the drugs approved by the US FDA, more than half of drugs among the total marketed drugs are marketed in a salt form. After forming salts with different acid radicals or basic group, not only some undesired physicochemical properties of drugs (such as crystallinity, thermodynamic property, hygroscopicity and stability, etc.) can be avoided, but also the biopharmaceutical properties of drugs (such as solubility, dissolution rate, bioavailability, etc.) can be improved. Physicochemical properties of APIs (such as crystal form, particle size and compressibility), which also have a significant impact on the formability and stability of drugs (especially solid dosage drugs, such as the most frequently used tablets in clinic), are one of the key technical issues in modern drug research and development.

Amlodipine, which belongs to a 1,4-dihydropyridine (1,4-DHP) calcium ion antagonists, is a drug for treating high blood pressure and characterized by a high specificity, a strong effect, less side effects, an ease of use, and a once-daily dosing frequency. Global sales of the amlodipine ranked first among antihypertensive drugs for many years. Amlodipine free base does not meet the requirements for manufacture of pharmaceutical preparations due to its poor water solubility and characteristics of prone to absorb moisture and agglomerate, and the marketed forms thereof are mainly salt forms of amlodipine formed with different acid radicals. Amlodipine besylate is a product developed and marketed by Pfizer in the United States, and its domestic trade name is Norvasc. In addition, other salt forms of amlodipine formed with different acid radicals, including maleate, mesylate, and L-aspartate, have also been marketed successively at home and abroad. Among the salt forms of amlodipine, amlodipine mesylate monohydrate has been marketed in many countries such as China and Europe due to its following characteristics: it is easily soluble in water, the solubility thereof is more than 10 time that of amlodipine besylate and is the highest among the marketed amlodipine salts; it is stable in nature, neither easy to absorb moisture in the air, nor easy to lose crystal water; it has better drugability and efficacy since its ease of absorption and less individual variation after oral administration. Amlodipine mesylate monohydrate is marketed in China under the trade name Xinluopin.

Chinese patent application CN1263093A discloses an amlodipine mesylate monohydrate and preparation method thereof. The method disclosed by this application comprises dissolving an amlodipine free base in an aqueous organic solvent (such as ethyl acetate), adding methanesulfonic acid under a cooling condition under water bath condition to conduct a salt-forming reaction, and obtaining the amlodipine mesylate monohydrate. However, there may be some problems during the preparation of the amlodipine mesylate monohydrate using said method: in the initial stage, the crystal is not easy to precipitate and a high supersaturation condition (achieved by adding about 40% or more of methanesulfonic acid) is needed; explosive crystallization is likely to occur once the crystals are precipitated, resulting in overfine crystallization and agglomeration, and uneven particle size distribution; the obtained product is easy to carry impurities that affect the purity of the product and tends to change color during the process of drying and storage. The obtained product has a particle size distribution of $D_{10}$: 1.0-3.0 μm, $D_{50}$: 5-15 μm, and $D_{90}$: 10-40 μm; a carr index of 35-45%, an angle of repose of 40-50°; and a bulk density of 0.20-0.30 g/mL. Meanwhile, when the API prepared by this preparation method is used to produce tablets, it is not suitable for direct tablet pressing using High-Speed Rotary Tablet Press Machine that commonly used in industrial tablet production due to small particle size and poor fluidity of the API, difficult to mix with the excipients evenly, and inaccurate tablet dosage.

International patent application WO2004/096770 discloses a process for preparing amlodipine mesylate monohydrate by stirring anhydrous amlodipine mesylate in a solvent containing water or exposing anhydrous amlodipine mesylate to an atmosphere saturated with moisture. However, although an amlodipine mesylate monohydrate with qualified water content can be obtained through this process, the instability of the process results in the obtained amlodipine mesylate monohydrate has poor uniformity and fluidity, and uncontrolled particle size. International patent application WO2004/096770 additionally discloses a method for preparing amlodipine mesylate monohydrate which is similar as that disclosed in CN1263093A. Specifically, said method comprises steps of: dissolving amlodipine and methanesulfonic acid in a water immiscible solvent medium (such as ethyl acetate) respectively, and adding the obtained methanesulphonic acid solution to the obtained amlodipine free base solution which is pre-cooled to conduct a salt-forming reaction. However, the problem of explosive crystallization also occurs during the preparation of amlodipine mesylate monohydrate using this method, resulting in overfine crystallization and agglomeration, and uneven particle size distribution; the obtained product is easy to carry impurities that affect the purity of the product and tends to change color during the process of drying and storage. The obtained product has a particle size distribution of $D_{10}$: 1.0-2.0 μm, $D_{50}$: 5-10 μm, and $D_{90}$: 10-35 μm; a carr index of 40-50%, an angle of repose of 45-50°; and a bulk density of 0.15-0.25 g/mL. Meanwhile, when the API prepared by this preparation method is used to produce tablets, it is not suitable for direct tablet pressing using High-Speed Rotary Tablet Press Machine that commonly used in industrial tablet production due to small particle size and poor fluidity of the API, difficult to mix with the excipients evenly, poor fluidity of tabletting materials and inaccurate tablet dosage.

European patent application EP1221438A2 discloses an anhydrous amlodipine mesylate (referred to as crystal form A) and an amlodipine mesylate monohydrate (referred to as crystal form B) and preparation method therefor. Further, it discloses that the anhydrous amlodipine mesylate (crystal form A) is prepared by conducting salt-forming reaction in an anhydrous solvent under a nitrogen atmosphere and then drying the obtained product under a nitrogen atmosphere.

However, the obtained anhydrous amlodipine mesylate (crystal form A) has poor druggability and is not suitable as an API to produce pharmaceutical preparations due to its strong hygroscopicity (it can take up large amount of water once being placed in moist air) and unstable physical properties. EP1221438A2 also discloses a method for preparing amlodipine mesylate monohydrate which is similar as that disclosed in CN1263093A. Specifically, said method comprises steps of: dissolving amlodipine free base in a water immiscible solvent medium (such as isopropyl alcohol), and adding a methanesulphonic acid solution to the pre-cooled amlodipine free base solution dropwise to conduct a salt-forming reaction. However, the problem of explosive crystallization also occurs during the preparation of amlodipine mesylate monohydrate using this method, resulting in overfine crystallization and agglomeration, and uneven particle size distribution; the obtained product is easy to carry impurities that affect the purity of the product and tends to change color during the process of drying and storage. The obtained product has a particle size distribution of $D_{10}$: 1.0-4.0 μm, $D_{50}$: 10-20 μm, and $D_{90}$: 15-45 μm; a carr index of 35-40%, an angle of repose of 35-50°; and a bulk density of 0.25-0.30 g/mL. Meanwhile, when the API prepared by this preparation method is used to produce tablets, it is not suitable for direct tablet pressing using High-Speed Rotary Tablet Press Machine that commonly used in industrial tablet production due to small particle size and poor fluidity of the API, difficult to mix with the excipients evenly, poor fluidity of tabletting materials and inaccurate tablet dosage.

For drugs that used in the treatment of chronic diseases such as hypertension and are clinically consumed in huge amounts, the use of direct compression technique with High-Speed Rotary Tablet Press Machine in the manufacture of said drugs has gradually become the mainstream tablet production technology in the modern pharmaceutical industry. High-Speed Rotary Tablet Press Machine refers to a rotary tablet press in which the axis of the die rotates with the turntable at a linear speed of not less than 60 m/min. Compared with the traditional technology of producing tablets through compressing wet or dry granulation, direct compression technique is simple, and does not require steps of wet granulation, heating, drying or dry granulation, resulting in great improvements in production efficiency and great reduction in energy consumption, which in turn results in great reduction in human resources and production costs. At the same time, drug degradation and increasing in impurities caused by solvents and heating condition can also be avoided, resulting in a product with quick disintegration and high dissolution, thereby quality of the obtained tablets is improved significantly. However, the direct compression technique with High-Speed Rotary Tablet Press Machine also puts forward higher requirements for the materials to be pressed. For example, the materials to be pressed should have excellent fluidity and compressibility, good material uniformity, and fully mixed main drug and excipient which will not separate from each other with the flow of the materials during the tablet pressing production. Therefore, amlodipine mesylate obtained using preparation processes disclosed in the prior art cannot meet the requirements for producing tablets by pressing power directly using High-Speed Rotary Tablet Press Machine in terms of particle size, uniformity, fluidity, and compressibility and the like.

In summary, there may be a huge demand in the market for amlodipine mesylate which has characteristics of good solubility in water, high purity, stable quality, no hygroscopicity, uniform particle distribution, and good fluidity and compressibility, and the preparation method therefor.

SUMMARY OF THE INVENTION

To overcome the defects in the prior art, the present invention provides an amlodipine mesylate monohydrate, preparation method therefor and use thereof. The amlodipine mesylate monohydrate provided by the present invention has characteristics of good solubility in water, high purity, stable quality, no hygroscopicity, uniform particle distribution, good fluidity and compressibility.

Therefore, one object of the present invention is to provide an amlodipine mesylate monohydrate, said monohydrate is in crystal form and has high purity and good fluidity and compressibility, and is suitable for producing tablets through direct compression with High-Speed Rotary Tablet Press Machine.

Another object of the present invention is to provide a method for preparing the above-mentioned amlodipine mesylate monohydrate.

Yet another object of the present invention is to provide a composition comprising the above-mentioned amlodipine mesylate monohydrate.

The technical solutions provided by the present invention are as follows.

In one aspect, the present invention provides an amlodipine mesylate monohydrate, said monohydrate is in crystal form, the crystal has a particle size distribution of $D_{10}$: 20-40 μm, $D_{50}$: 55-85 μm, $D_{90}$: 95-140 μm, a carr index of 10-25%, an angle of repose (α) of 15-35°, a bulk density of 0.25-0.45 g/mL, and a purity of more than 99.5%.

The Carr index and angle of repose are indications of the flowability of a powdery material. To a certain extent, the Carr index is an indication of the compressibility of a powdery material. Carr index=(tap density-bulk density)/tap density*100%.

The angle of repose (α) refers to the maximum angle formed between the free inclined plane and the horizontal plane in a powder piled layer. The smaller the angle of repose (α) is, the better the flowability is. It is generally believed that the powder can flow freely if the a is less than 30°, and the flowability of the power is acceptable if the a is between 30° and 40°, while the power may have poor flowability if the a is greater than 40°.

The particle size of crystals can be measured by a Malvern Lazer Particle Analyzer which is a dry method. The particle size is related to the fluidity of a powder, and generally the larger the particle size is and the more concentrated the particle distribution is, the better the fluidity is. During the crystallization process, an average particle size ($D_{50}$) of less than 15 μm may lead to difficulty in filtration and drying and easy to carry and absorb more impurities. Furthermore, the uniformity of particle size distribution can also have an impact on the properties of APIs.

Preferably, said crystal has a crystal form which is consistent with that of APIs prepared in CN1263093A, and both are the crystal form B (a crystal form of amlodipine mesylate monohydrate) reported in EP1221438A2 (which is hereby incorporated by reference in its entirety).

Preferably, said crystal has a particle size distribution of $D_{10}$: 28-40 μm, $D_{50}$: 65-80 μm, $D_{90}$: 100-130 μm.

Preferably, said crystal has a carr index of 10-20%.

Preferably, said crystal has an angle of repose (α) of 15-25°.

Preferably, said crystal has a bulk density of 0.30-0.45 g/mL.

In another aspect, the present invention provides a method for preparing the above-mentioned amlodipine mesylate monohydrate, said method comprises following steps:

dissolving an amlodipine free base in a water-containing organic solvent and adding methanesulfonic acid dropwise under low temperature condition to give a saturated solution, stirring and adding a seed crystal of amlodipine mesylate monohydrate thereto, adding methanesulfonic acid dropwise continuously under stirring to give crystals, growing the crystals, centrifuging, washing, and vacuum drying before obtaining.

Reaction route involved in the above method is as follows:

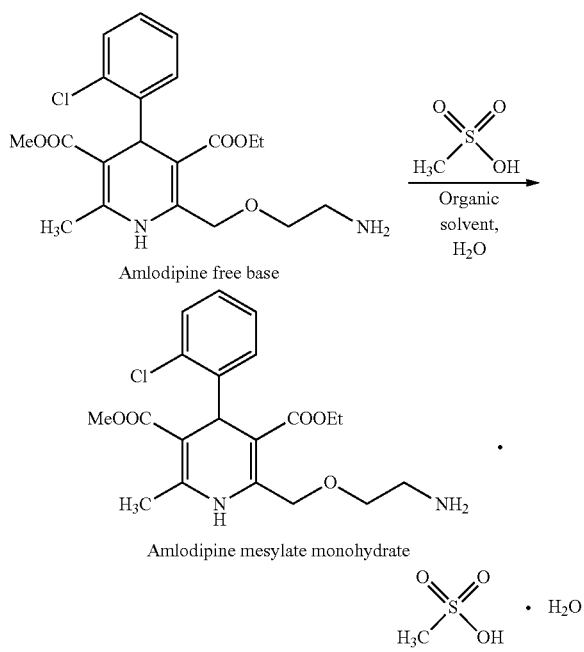

Preferably, said amlodipine free base can be a solid raw material or a solution of amlodipine free base without separation. For example, the solution of amlodipine free base without separation can be such as an ethyl acetate solution of amlodipine free base which obtained by removing benzene sulfonic acid group from amlodipine besylate in ethyl acetate using a sodium hydroxide aqueous solution, or an ethyl acetate solution of amlodipine free base which obtained by hydrolyzing phthaloyl amlodipine with methylamine. After measuring the content of water in the solution of amlodipine free base without separation and making up the amount of water required to form crystal water, the solution can be directly used to form a salt with methanesulfonic acid by adding seed crystal without being subjected to separation, thereby preparing an amlodipine mesylate monohydrate.

Preferably, the organic solvent is one or more selected from the group consisting of ethyl acetate, acetone, acetonitrile, and isopropanol, preferably ethyl acetate or acetone.

Preferably, a molar ratio between the water contained in the organic solvent and the amlodipine free base is 1.0-10.0, preferably 1.0-5.0.

Preferably, a ratio (m:v) between the amlodipine free base and the organic solvent is 1:3-1:15, more preferably 1:4-1:10, further more preferably 1:4-1:6.

Preferably, the added seed crystal of amlodipine mesylate monohydrate has a crystal form which is consistent with that of APIs prepared in CN1263093A, and both are the crystal form B (a crystal form of amlodipine mesylate monohydrate) reported in EP1221438A2.

Preferably, an amount of the added seed crystal of amlodipine mesylate monohydrate is 0.5%-10%, more preferably 1% by weight of the amlodipine free base.

Preferably, a total amount of methanesulfonic acid added is 0.9 to 2.0 equivalents, more preferably 0.9 to 1.2 equivalents of amlodipine free base (herein, the equivalent refers to a molar ratio relative to amlodipine free base).

Preferably, an amount of methanesulfonic acid added before adding the seed crystal of amlodipine mesylate monohydrate is 10%-30%, more preferably 15%-25% (mass percentage) of the total amount of methanesulfonic acid added.

Preferably, the low temperature condition refers to a condition where the temperature is 0-30° C., more preferably 0-25° C.

Preferably, the growing of the crystals is conducted under a temperature of −10° C.-30° C., more preferably 0-10° C., furthermore preferably 0-5° C.

Preferably, the growing of the crystals is conducted for 0.5-24 hours, more preferably 2-4 hours.

Preferably, a stirring rate used before adding the seed crystal of amlodipine mesylate monohydrate is 150-200 rpm/min, a stirring rate used after adding the seed crystal of amlodipine mesylate monohydrate is 100 rpm/min-60 rpm/min.

Preferably, the vacuum drying is conducted under a vacuum degree of −0.04~−0.07 MPa.

Preferably, the vacuum drying is conducted under a drying temperature of 20-45° C., more preferably 20-30° C.

Reaction routes involved in the present invention are as follows:

Route 1

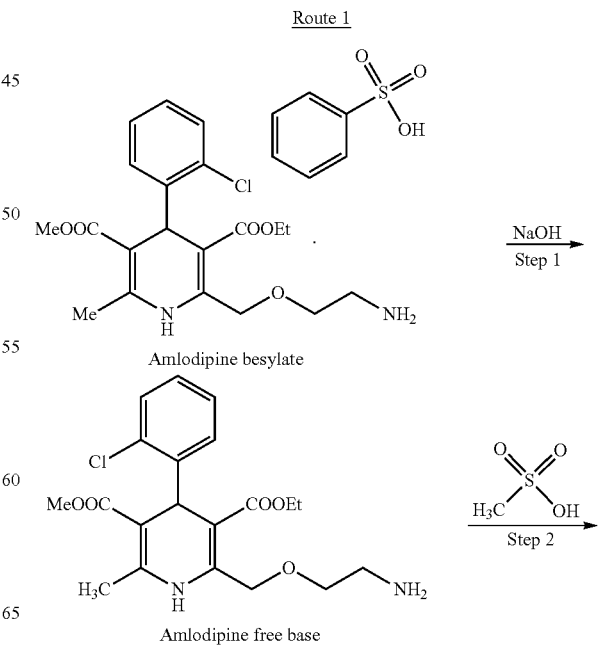

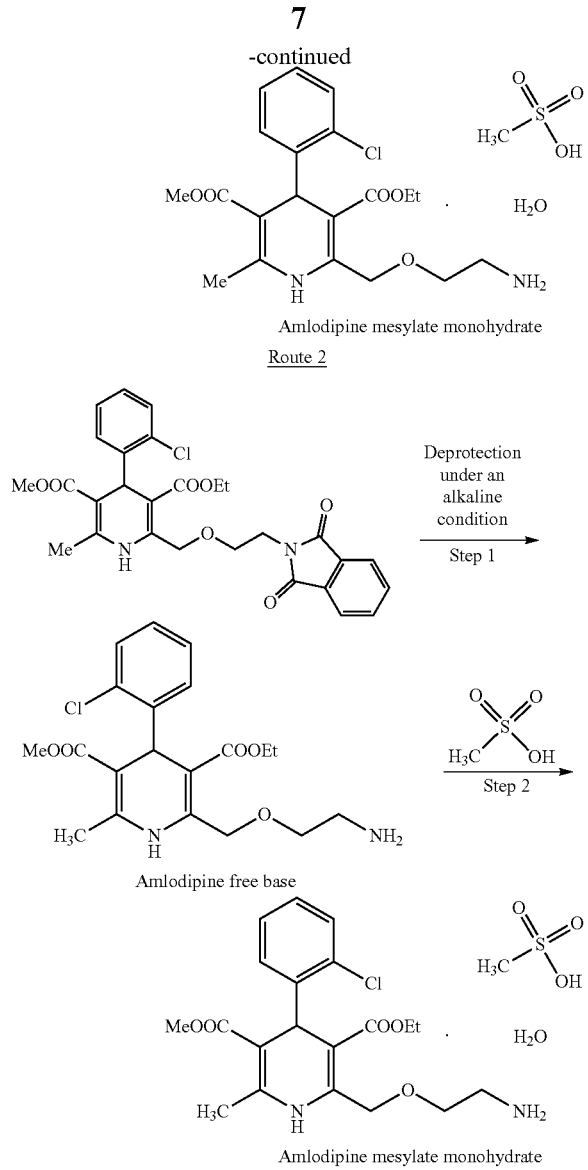

In yet another aspect, the present invention provides a tablet comprising the above-mentioned amlodipine mesylate monohydrate.

Preferably, the tablet further comprises pharmaceutical excipients commonly used in the art, such as fillers, disintegrants and lubricants.

Homogeneous powder materials with excellent fluidity and compressibility can be obtained by mixing the crystals of amlodipine mesylate monohydrate prepared by the present invention which have high purity and improved fluidity and compressibility with pharmaceutical excipients commonly used in the prior art. The obtained mixed powder material has a carr index of 20-25%, an angle of repose of 20-30°, and a bulk density of 0.35-0.40 g/mL. Tablets obtained by compressing the mixed powder material have a hardness of more than 4 kg, a friability of not greater than 0.3%, and a content uniformity (A+2.2S) of less 5. The obtained mixed powder material has excellent fluidity and compressibility and is suit to produce tablets with good quality by direct compression using High-Speed Rotary Tablet Press Machine. In other words, amlodipine mesylate tablets with high quality can be prepared by compressing the mixed powder material directly using High-Speed Rotary Tablet Press Machine (such as ZP129 High-Speed Rotary Tablet Press Machine).

Preferably, the filler is one or more selected from microcrystalline cellulose, spray-dried lactose, starch, and calcium hydrogen phosphate, which are suitable to be used in direct compression, more preferably, the filler is type 102 microcrystalline cellulose, which is cheap and has good stability, and does not react chemically with amlodipine. The amount of the filler used is 30-80%, preferably 60-70% of the tablet weight. In addition, the filler used has an average particular size of 65-80 μm, a bulk density of 0.30-0.35 g/mL, and an angle of repose of 30-35°.

Preferably, the disintegrant is one or more selected from pregelatinized starch, low-substituted hydroxypropyl cellulose and sodium carboxymethyl starch, which are suitable to be used in direct compression, more preferably, the disintegrant is the pregelatinized starch which is cheap and has good dry adhesion. The amount of the disintegrant used is 20-40%, preferably 25-35% of the tablet weight. In addition, the disintegrant used has an average particular size of 60-80 μm, a bulk density of 0.35-0.45 g/mL, and an angle of repose of 30-35°.

Preferably, the lubricant comprises magnesium stearate, stearic acid, silica gel powder, talc and the like, the magnesium stearate which has good lubricating effect and flow-aiding effect, as well as low price is more preferred. The amount of the lubricant used is 0.1%-3.0%, preferably 0.15-0.5% of the tablet weight. In addition, the lubricant used has an average particular size of 5-10 μm, and a bulk density of 0.15-0.30 g/m L.

Tablet compressing processes involved in the manufacture of tablets are familiar to those skilled in the art, for example, the tablets of the present invention can be prepared as follows: mixing the API and the excipients uniformly in an equal incremental manner (in which the lubricant is added thereto at the end) to obtain a uniformly mixed powder material with high fluidity, then the mixed powder material is directly used to be compressed using High-Speed Rotary Tablet Press Machine with appropriate tableting parameters. In some embodiments, the tablets can have a size of 6.4 mg per tablet (equivalent to 5.0 mg of amlodipine free base) and can be produced through direct compression using High-Speed Rotary Tablet Press Machine (such as type ZP129 High-Speed Rotary Tablet Press Machine) with following tableting parameters: rotational speed: 30-45 rmp/min, hardness: 2.0-17.0 kg; more preferably, rotational speed: 35-40 rmp/min, hardness: 4.0-10.0 kg.

The preparation method of the present invention is stable and simple to operate, and the product obtained thereby has high purity, good fluidity, uniform and controllable particle size distribution, and good compressibility. When applying the product prepared through the method of present invention in the manufacture of tablets, smoothly compressing process can be achieved and tablets with good content uniformity and stable quality can be obtained.

The present invention has the following advantages compared with the prior art: The amlodipine mesylate monohydrate prepared by the present invention is in crystal form which has a particle size distribution of $D_{10}$: 20-40 μm, $D_{50}$: 55-85 μm, $D_{90}$: 95-140 μm, a carr index of 10-25%, an angle of repose of 15-35°, a bulk density of 0.25-0.45 g/mL, and a purity of more than 99.5%. Meanwhile, the crystal is characterized by high purity, good fluidity and compressibility and is suited to produce tables by direct compression using High-Speed Rotary Tablet Press Machine.

However, the crystal of amlodipine mesylate monohydrate prepared by the prior method (such as that disclosed in CN1263093A) has a particle size distribution of $D_{10}$: 1.0-3.0 μm, $D_{50}$: 5-15 μm, $D_{90}$: 10-40 μm, a carr index of 35-45%, an angle of repose of 40-50°, a bulk density of 0.20-0.30 g/mL. It can be seen this crystal has poor fluidity and compressibility and cannot be suited to produce tables by direct compression using High-Speed Rotary Tablet Press Machine.

It is shown through results of X-ray powder diffraction and differential thermal analysis that the amlodipine mesylate monohydrate prepared by the present method has a crystal form which is consistent with that of APIs prepared in CN1263093A, and both are the crystal form B (a crystal form of amlodipine mesylate monohydrate) reported in EP1221438A2. However, the particular particle size distribution possessed by the amlodipine mesylate monohydrate prepared in the present invention enable it has a fluidity different from that in the prior art and significant improved properties in impurities and stability (especially color).

BRIEF DESCRIPTION OF THE DRAWINGS

Hereinafter, the embodiments of the present invention will be described with reference to the accompanying drawings in detail, in which.

DETAILED DESCRIPTION OF PREFERRED EMBODIMENTS

Figure 1:
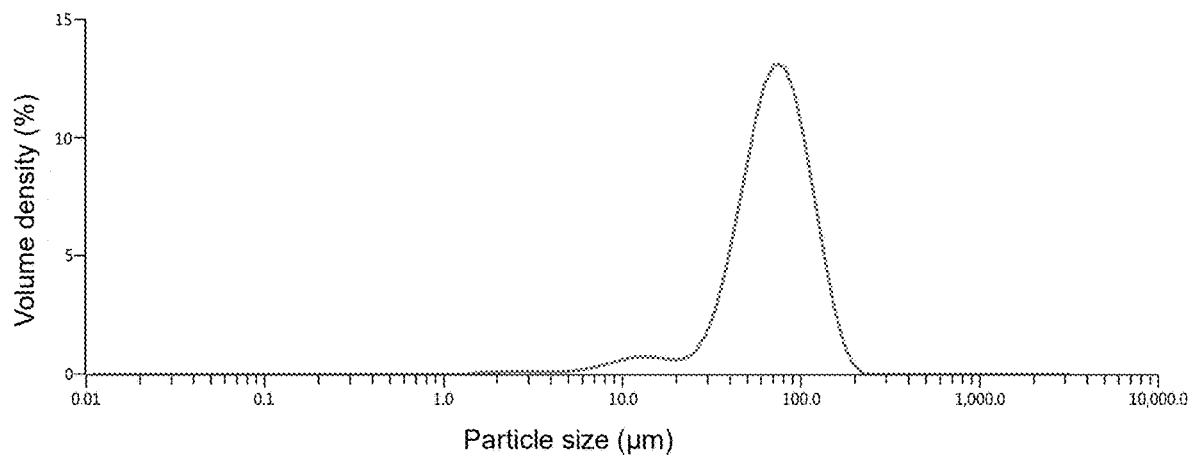
FIG. 1 shows a particle size distribution of the product prepared in Example 1.

The following provided examples are only used to illustrate the present invention, rather than limiting the scope of the present invention in any way.

The amlodipine free base used in the following examples is commercially available, which can also be synthesized by reference to literatures in the prior art.

Determination of parameters of API of amlodipine mesylate monohydrate regarding quality such as the content and related substances and the like, is conducted through methods for determining amlodipine mesylate described in "National Drug Standard" [$WS_1$-(X-497)-2003Z-2017]. The chromatographic conditions are as follows: chromatographic column: Phenomenex Luna C18 column filled with octadecylsilane chemically bonded silica (4.6 mm×250 mm, 5 μm) or columns with performance comparable to that of Phenomenex Luna C18 column; mobile phase: a solution of methanol-acetonitrile-0.7% triethylamine (35:15:50), wherein the 0.7% triethylamine can be obtained through taking 7.0 mL triethylamine and diluting it to 1000 mL with water, adjusting pH of the dilution to 3.0±0.1 with phosphoric acid; detection wavelength: 239 nm.

Determination of parameters of tablets of amlodipine mesylate monohydrate regarding quality such as the content, related substances, content uniformity, dissolution rate and the like, is conducted through methods for determining amlodipine mesylate tablets described in "National Drug Standard" [$WS_1$-(X-262)-2004Z-2017]. The chromatographic conditions for the determination of the content, related substances, content uniformity of the tablets are the same as that used for the determination of the API. Determination of the dissolution rate can be conducted as follows: 500 mL of hydrochloric acid solution (0.9 mL of hydrochloric acid added to 1000 mL of water) was served as a dissolution medium, the rotation speed was 75 rmp/min and a dissolution was conducted for 30 minutes, a proper amount of the obtained solution was taken, filtered, and the obtained filtrate was used as the test solution; the reference substance of amlodipine mesylate accurately was weighed, dissolved with an appropriate amount of methanol before being diluted with the dissolution medium to give a solution containing about 10 μg of amlodipine per 1 mL, the obtained solution was served as a reference solution; the absorbance of the above two solutions was measured by ultraviolet-visible spectrophotometry at a wavelength of 239 nm (General Rule 0401, Volume IV, Pharmacopoeia of the People's Republic of China (2015 edition)), and then the dissolution rate was calculated according to the external standard method.

Determination of other parameters of API or tablets of amlodipine mesylate monohydrate regarding quality such as water content, angle of repose, carr index, particle size, bulk density, and the like, is conduct with conventional methods well known to those skilled in the art.

The seed crystal of amlodipine mesylate monohydrate added in the following examples has a crystal form which is consistent with that of APIs prepared in CN1263093A, and both are the crystal form B (a crystal form of amlodipine mesylate monohydrate) reported in EP1221438A2.

Experimental Example 1: Preparation of Amlodipine Mesylate Monohydrate Using Amlodipine Free Base as Starting Material 100 g of amlodipine free base (245.1 mmol), ethyl acetate (500 mL) and purified water (5.29 mL, 1.2 eq) were sequentially added to a 2000 mL three-necked flask, and then stirred for 15 minutes to dissolve. At room temperature, 5.88 g of methanesulfonic acid (61.3 mmol) was weighted firstly, and then was quickly added into the obtained reaction solution through a constant-pressure dropping funnel under stirring to give a clear solution, the dropping rate was controlled at 5 mL/min and the stirring rate was controlled at 160 rpm/min. At room temperature, 1.25 g of seed crystals of amlodipine mesylate monohydrate was added to the clear solution to give a suspension under stirring with a stirring rate of 70 rpm/min. 17.6 g of methanesulfonic acid (183.9 mmol) was weighted secondly, and then was slowly added into the suspension through a constant-pressure dropping funnel under stirring by controlling the dropping rate at 0.5 mL/min. When the addition of the methanesulfonic acid was completed, the obtained mixture was incubated continuously at room temperature and stirred for growing the crystals for 3 hours, filtered, and rinsed with ethyl acetate to obtain white crystals. The obtained crystals were vacuum-dried at a drying temperature of 30° C. for 3 hours to give 88.3 g of product, i.e white crystals in solid form (yield 69%). The purity of the product determined through HPLC was 99.90%, the water content of the product determined through Karl Fischer method was 3.49%. The product has a particle size distribution of $D_{10}$: 43 μm, $D_{50}$: 92 μm and $D_{90}$: 151 μm.

It can be seen that a significant decrease in product yield, low salt-forming rate and serious sample loss will be resulted in if the crystallization is carried out at room temperature.

Experimental Example 2: Preparation of Amlodipine Mesylate Monohydrate Using Amlodipine Free Base as Starting Material 100 g of amlodipine free base (245.1 mmol), ethyl acetate (500 mL) and purified water (5.29 mL, 1.2 eq) were sequentially added to a 2000 mL three-necked flask, and then stirred for 15 minutes to dissolve. At room temperature (25° C.), 5.88 g of methanesulfonic acid (61.3 mmol) was weighted firstly, and then was quickly added into the obtained reaction solution through a constant-pressure dropping funnel under stirring to give a clear solution, the dropping rate was controlled at 5 mL/min and the stirring rate was controlled at 160 rpm/min. At room temperature, 1.25 g of seed crystals of amlodipine mesylate monohydrate was added to the clear solution to give a suspension under stirring with a stirring rate of 70 rpm/min. 17.6 g of methanesulfonic acid (183.9 mmol) was weighted secondly, and then was slowly added into the suspension through a constant-pressure dropping funnel under stirring by controlling the dropping rate at 0.5 mL/min. When the addition of the methanesulfonic acid was completed, the obtained mixture was incubated continuously at low temperature (0° C.) and stirred for growing the crystals for 3 hours, filtered, and rinsed with ethyl acetate to obtain white crystals. The obtained crystals were vacuum-dried at a drying temperature of 30° C. for 3 hours to give 122.8 g of product, i.e white crystals in solid form (yield 96%). The purity of the product determined through HPLC was 99.90%, the water content of the product determined through Karl Fischer method was 3.54%. The product has a particle size distribution of $D_{10}$: 32 μm, $D_{50}$: 68 μm and $D_{90}$: 117 μm.

Experimental Example 3: Preparation of Amlodipine Mesylate Monohydrate Using Amlodipine Free Base as Starting Material 210 g of amlodipine free base (514.7 mmol), ethyl acetate (1000 mL) and purified water (11.1 mL, 1.2 eq) were sequentially added to a 3000 mL three-necked flask, and then stirred for 15 minutes to dissolve. At low temperature (5° C.), 12.3 g of methanesulfonic acid (128.7 mmol) was weighted firstly, and then was quickly added into the obtained reaction solution through a constant-pressure dropping funnel under stirring to give a clear solution, the dropping rate was controlled at 5 mL/min and the stirring rate was controlled at 160 rpm/min. At room temperature, 2.6 g of seed crystals of amlodipine mesylate monohydrate was added to the clear solution to give a suspension under stirring with a stirring rate of 270 rpm/min. 37.1 g of methanesulfonic acid (386.0 mmol) was weighted secondly, and then was slowly added into the suspension through a constant-pressure dropping funnel under stirring by controlling the dropping rate at 0.5 mL/min. When the addition of the methanesulfonic acid was completed, the obtained mixture was incubated continuously at low temperature (5° C.) and stirred for growing the crystals for 3 hours, filtered, and rinsed with ethyl acetate to obtain white crystals. The obtained crystals were vacuum-dried at a drying temperature of 30° C. for 3 hours to give 257.9 g of product, i.e white crystals in solid form (yield 95%). The purity of the product determined through HPLC was 99.92%, the water content of the product determined through Karl Fischer method was 3.63%. The product has a particle size distribution of $D_{10}$: 34 μm, $D_{50}$: 69 μm and $D_{90}$: 120 μm.

Figure 2:
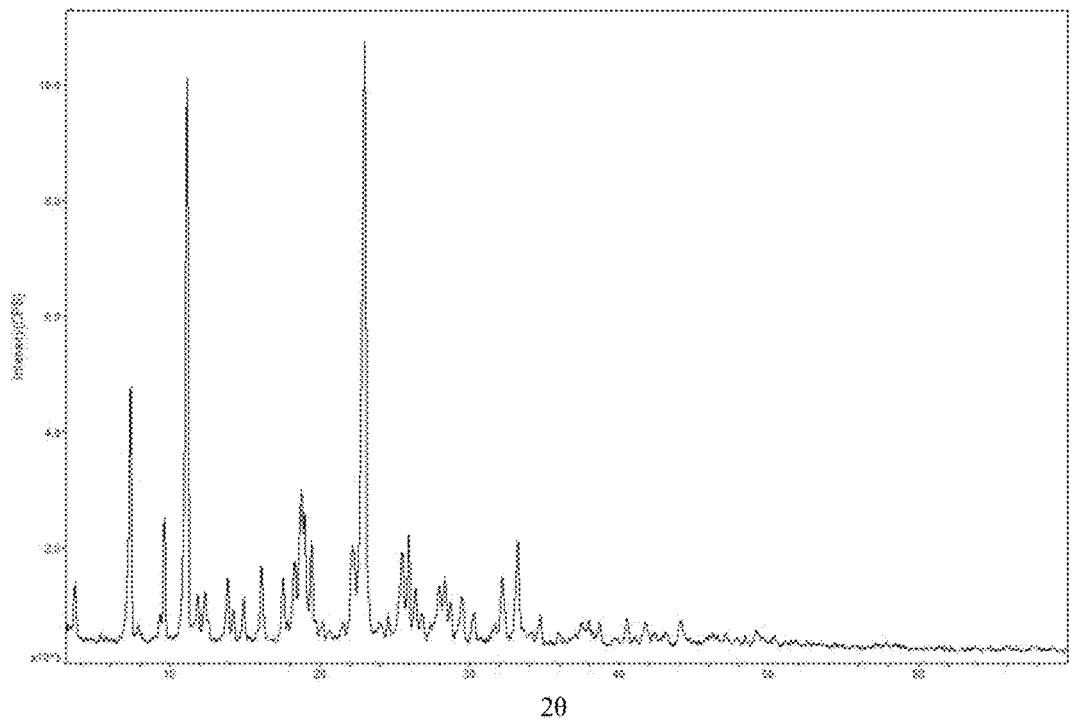
FIG. 2 shows an X-ray powder diffraction spectrum of the product prepared in Example 1.
Figure 3:
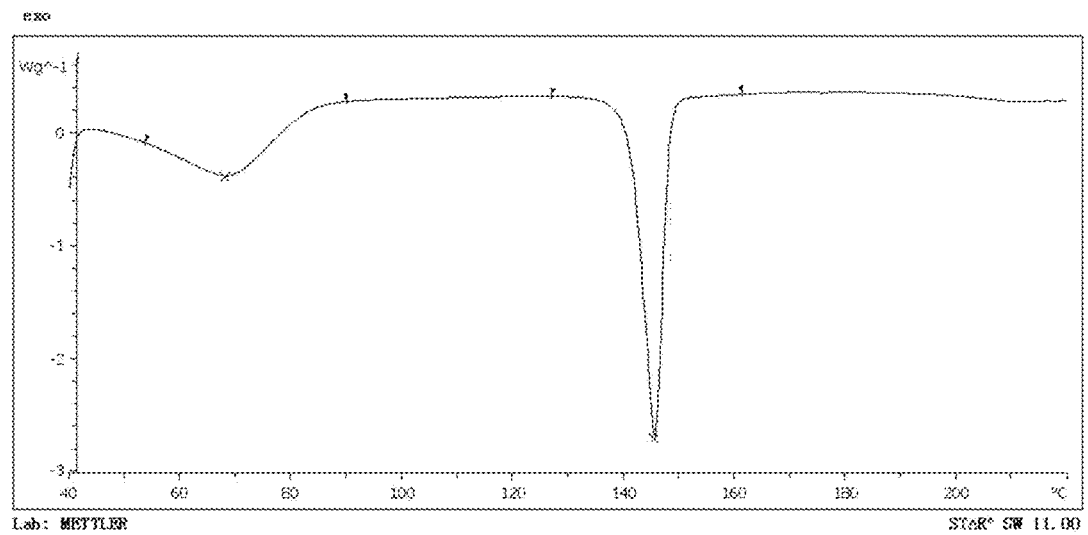
FIG. 3 shows a differential thermal analysis spectrum of the product prepared in Example 1.

Example 1: Preparation of Amlodipine Mesylate Monohydrate with High Fluidity Using Amlodipine Free Base as Starting Material 100 g of amlodipine free base (245.1 mmol), ethyl acetate (500 mL) and purified water (5.29 mL, 1.2 eq) were sequentially added to a 2000 mL three-necked flask, stirred for 15 minutes to dissolve and then the obtained reaction solution was cooled down to 0° C. to 5° C. 5.88 g of methanesulfonic acid (61.3 mmol) was weighted firstly, and then was quickly added into the obtained reaction solution through a constant-pressure dropping funnel under stirring to give a clear solution, the dropping rate was controlled at 5 mL/min and the stirring rate was controlled at 160 rpm/min. The temperature of the clear solution was kept at 0° C. to 5° C., then 1.25 g of seed crystals of amlodipine mesylate monohydrate was added thereto to give a suspension under stirring with a stirring rate of 100-60 rpm/min. 17.6 g of methanesulfonic acid (183.9 mmol) was weighted secondly, and then was slowly added into the suspension through a constant-pressure dropping funnel under stirring by controlling the dropping rate at 0.5 mL/min. When the addition of the methanesulfonic acid was completed, the obtained mixture was incubated continuously at 0° C. and stirred for growing the crystals for 3 hours, filtered, and rinsed with ethyl acetate to obtain white crystals. The obtained crystals were vacuum-dried at a drying temperature of 30° C. for 3 hours to give 122.5 g of product, i.e white crystals in solid form (yield 96%). The purity of the product determined through HPLC was 99.92%, the water content of the product determined through Karl Fischer method was 3.51% (the theoretical value is 3.44%). The product has a particle size distribution of $D_{10}$: 33.9 μm, $D_{50}$: 70.2 μm and $D_{90}$: 121 μm; a carr index of 23%, an angle of repose of 29°, and a bulk density of 0.32 g/mL. The particle size distribution of the product was shown in FIG. 1, the X-ray powder diffraction spectrum of the product was shown in FIG. 2, and the differential thermal analysis spectrum of the product was shown in FIG. 3. It can be seen the product has a uniform particle size distribution, and a bulk density and a particle size which are similar to that of the type 102 microcrystalline cellulose. The carr index and the angle of repose of the product indicated that the crystals have good fluidity and stability (see table-1).

TABLE 1

Results of accelerated test (sealed and packaged in aluminum-plastic composite film bags, 40° C., 75% RH).

| Time | Character | Water content (%) | Related substance (%) | Content (%) | Average particle size (μm) | Bulk density (g/mL) | Carr index(%) |
|---|---|---|---|---|---|---|---|
| 0 month | White solid | 3.51 | 0.07 | 99.92 | 70.2 | 0.32 | 23 |
| 3 months | White solid | 3.49 | 0.07 | 99.78 | 70.6 | 0.31 | 23 |
| 6 months | White solid | 3.50 | 0.08 | 99.71 | 69.5 | 0.33 | 24 |

Figure 4:
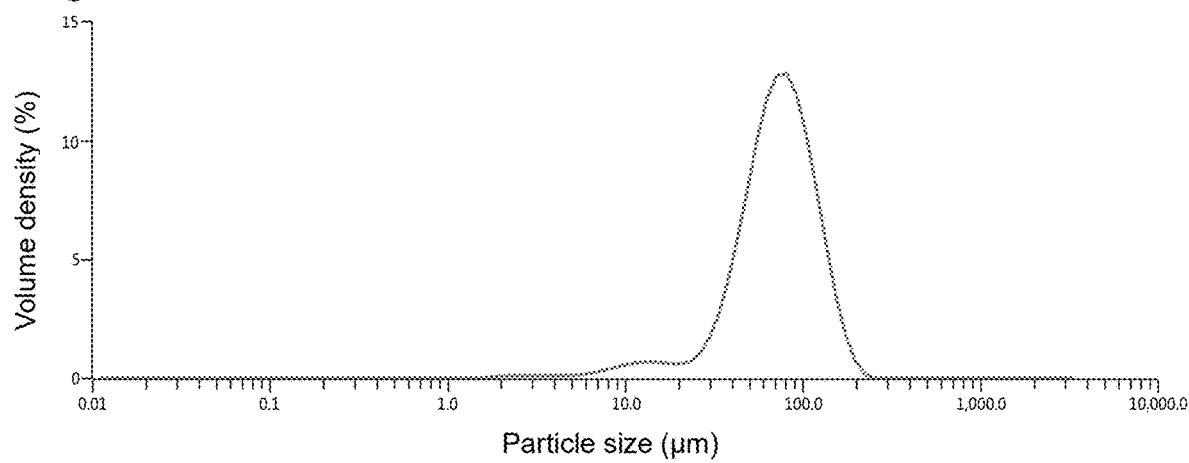
FIG. 4 shows a particle size distribution of the product prepared in Example 2.
Figure 5:
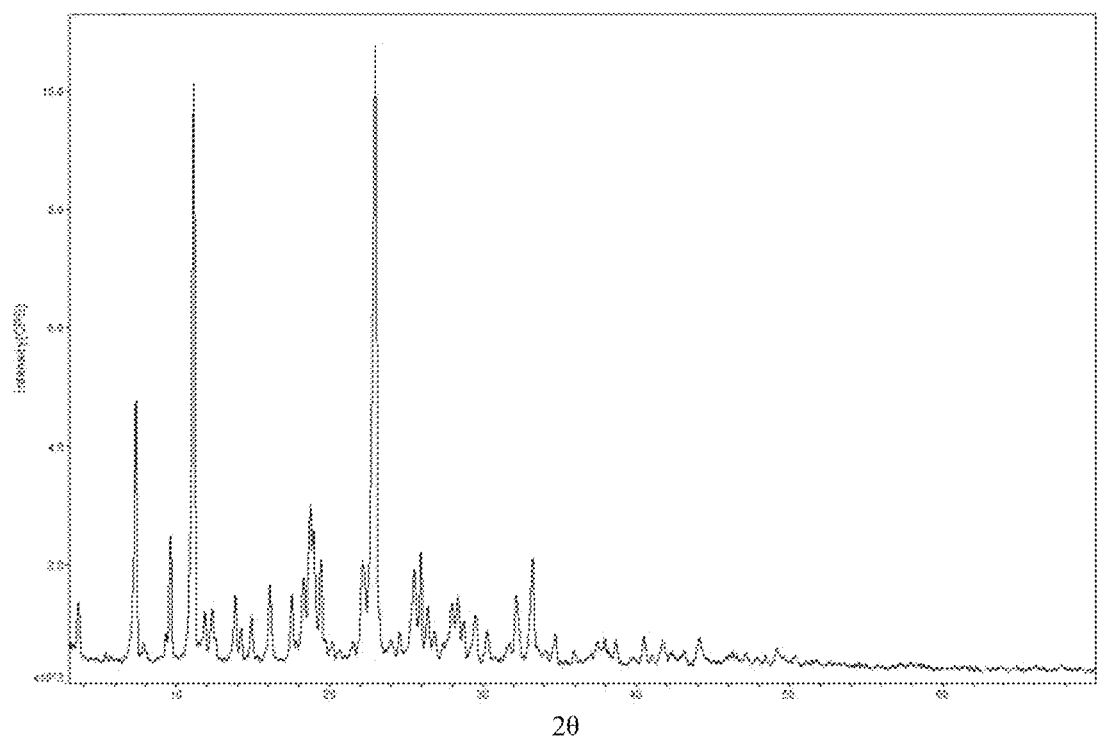
FIG. 5 shows an X-ray powder diffraction spectrum of the product prepared in Example 2.
Figure 6:
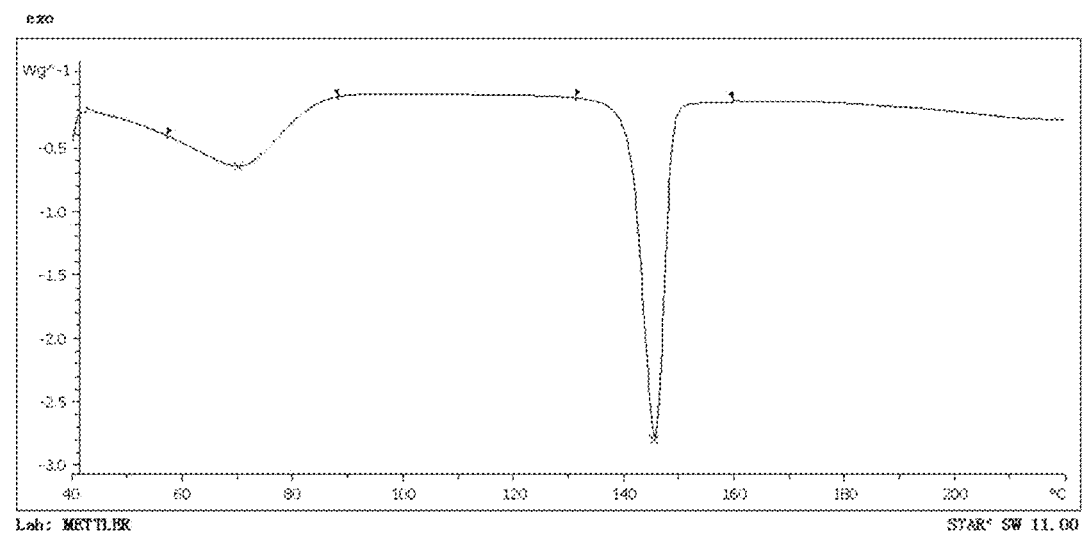
FIG. 6 shows a differential thermal analysis spectrum of the product prepared in Example 2.

Example 2: Preparation of Amlodipine Mesylate Monohydrate with High Fluidity Using Amlodipine Besylate as Starting Material 200 g of amlodipine besylate (352.7 mmol), ethyl acetate (750 mL) and purified water (75 mL) were sequentially added to a 2000 mL three-necked flask, stirred for 15 minutes. 16.9 g of sodium hydroxide (1.2 eq, 423.3 mmol) was weighted and dissolved in 211 mL purified water to give a sodium hydroxide solution. The sodium hydroxide solution was then added dropwise under a cooling condition with water bath for about 10 min. When the addition of the NaOH aqueous solution was completed, the reaction solution was continued to be stirred for about 30 min before terminating the reaction. The obtained reaction solution was allowed to stand for phase separation, the aqueous phase was extracted twice with 200 mL of ethyl acetate, the combined organic phases were then washed with purified water to obtain an ethyl acetate layer with a volume of 1100 mL (the density measured was 0.98 g/mL). The water content of the ethyl acetate layer determined through Karl Fischer method was 1.0%, i.e. the amount of water contained in the ethyl acetate layer was 10.8 g, which meant there was no need to further make up the amount of water as the theoretical amount of water required was 6.35 g. The ethyl acetate layer was cooled down to 0° C. to 5° C., and then 8.46 g of methanesulfonic acid (88.2 mmol) was weighted and quickly added thereto through a constant-pressure dropping funnel under stirring to give a clear solution, the dropping rate was controlled at 5 mL/min and the stirring rate was controlled at 175 rpm/min. The temperature of the clear solution was kept at 0° C. to 5° C., then 1.84 g of seed crystals of amlodipine mesylate monohydrate was added thereto to give a suspension under stirring with a stirring rate of 100-60 rpm/min. 25.4 g of methanesulfonic acid (264.3 mmol) was weighted secondly, and then was slowly added into the suspension through a constant-pressure dropping funnel under stirring by controlling the dropping rate at 1.0 mL/min. When the addition of the methanesulfonic acid was completed, the obtained mixture was incubated continuously at 0° C. and stirred for growing the crystals for 3 hours, filtered, and rinsed with ethyl acetate to obtain white crystals. The obtained crystals were vacuum-dried at a drying temperature of 30° C. for 3 hours to give 165.7 g of product in white solid (yield 90%). The purity of the product determined through HPLC was 99.95%, the water content of the product determined through Karl Fischer method was 3.51% (the theoretical value is 3.44%). The product has a particle size distribution of $D_{10}$: 34.8 μm, $D_{50}$: 72.1 μm and $D_{90}$: 126 μm; a carr index of 23%, an angle of repose of 31°, and a bulk density of 0.33 g/mL. The particle size distribution of the product was shown in FIG. 4, the X-ray powder diffraction spectrum of the product was shown in FIG. 5, and the differential thermal analysis spectrum of the product was shown in FIG. 6. It can be seen the product has a uniform particle size distribution, and a bulk density and a particle size which are similar to that of the type 102 microcrystalline cellulose. The carr index and the angle of repose of the product indicated that the crystals have good fluidity and stability (see table-2).

TABLE 2

Results of accelerated test (sealed and packaged in aluminum-plastic composite film bags, 40° C., 75% RH).

| Time | Character | Water content (%) | Related substance (%) | Content (%) | Average particle size (μm) | Bulk density (g/mL) | Carr index(%) |
|---|---|---|---|---|---|---|---|
| 0 month | White solid | 3.51 | 0.06 | 99.95 | 72.1 | 0.33 | 23 |
| 3 months | White solid | 3.52 | 0.07 | 99.81 | 71.8 | 0.32 | 24 |
| 6 months | White solid | 3.49 | 0.08 | 99.73 | 72.4 | 0.32 | 24 |

Figure 7:
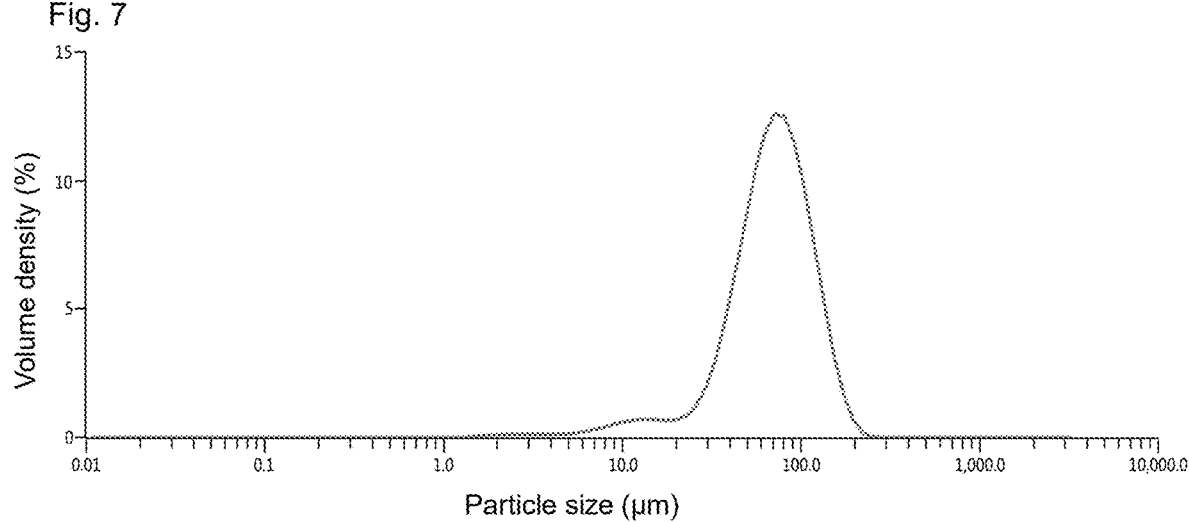
FIG. 7 shows a particle size distribution of the product prepared in Example 3.
Figure 8:
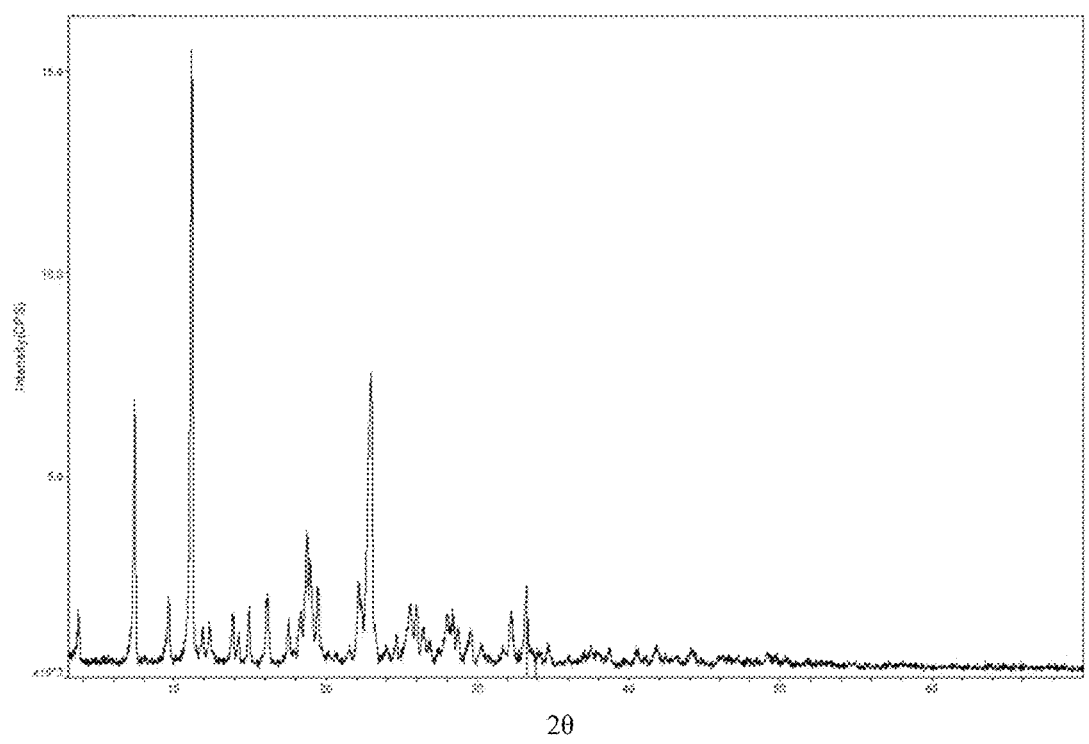
FIG. 8 shows an X-ray powder diffraction spectrum of the product prepared in Example 3.
Figure 9:
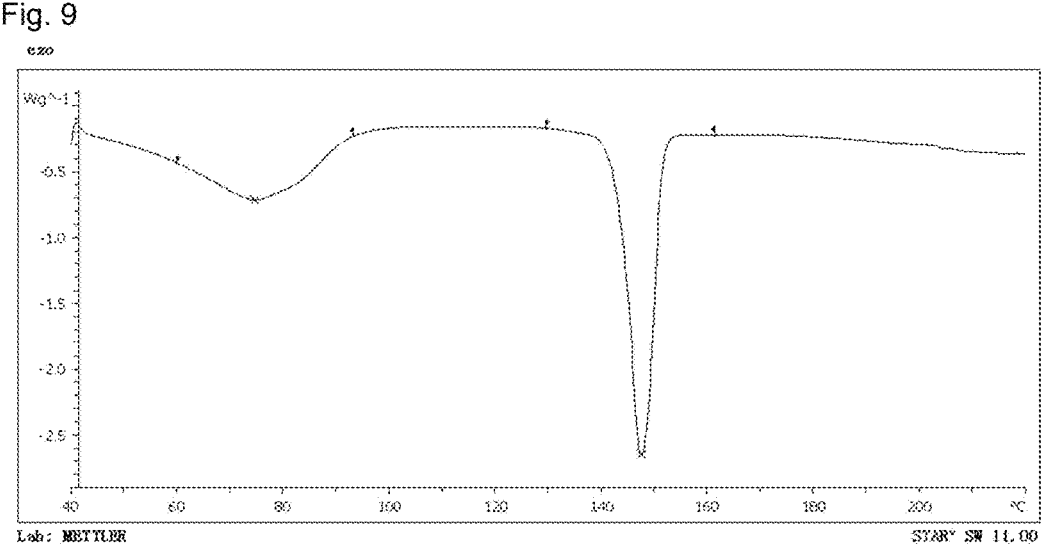
FIG. 9 shows a differential thermal analysis spectrum of the product prepared in Example 3.

Example 3: Scaled-Up Preparation of Amlodipine Mesylate Monohydrate with High Fluidity 7.0 kg of amlodipine free base (17.16 mol), ethyl acetate (35 L) and purified water (370.66 mL, 1.2 eq) were sequentially added to a 100 L reaction still, stirred for 30 minutes to dissolve and then the obtained solution of amlodipine free base in ethyl acetate was cooled down to −5° C. to 5° C. 296.2 g of methanesulfonic acid (3.09 mol) was weighted firstly, and then was quickly added into the solution through a constant-pressure dropping funnel under stirring to give a clear solution, the dropping rate was controlled at 10-15 mL/min and the stirring rate was controlled at 200 rpm/min. The temperature of the clear solution was kept at 0° C. to 5° C., then 90 g of seed crystals of amlodipine mesylate monohydrate was added thereto to give a suspension under stirring with a stirring rate of 100 rpm/min. 1.236 kg of methanesulfonic acid (12.87 mol) was weighted secondly, and then was slowly added into the suspension through a constant-pressure dropping funnel under stirring by controlling the dropping rate at 5 mL/min. When the addition of the methanesulfonic acid was completed, the obtained mixture was incubated continuously at 0° C. and stirred for growing the crystals for 4 hours, filtered, and rinsed with ethyl acetate to obtain white crystals. The obtained crystals were vacuum-dried at a drying temperature of 25-35° C. for 2-4 hours to give 8.51 kg of white solid product (yield 95%). The purity of the product determined through HPLC was 99.93%, the water content of the product determined through Karl Fischer method was 3.50% (the theoretical value is 3.44%). The product has a particle size distribution of $D_{10}$: 32.9 μm, $D_{50}$: 70.1 μm and $D_{90}$: 124 μm; a carr index of 24%, an angle of repose of 33°, and a bulk density of 0.30 g/mL. The particle size distribution of the product was shown in FIG. 7, the X-ray powder diffraction spectrum of the product was shown in FIG. 8, and the differential thermal analysis spectrum of the product was shown in FIG. 9. It can be seen the product has a uniform particle size distribution, and a bulk density and a particle size which are similar to that of the type 102 microcrystalline cellulose. The carr index and the angle of repose of the product indicated that the crystals has good fluidity and stability (see table-3).

TABLE 3

Results of accelerated test (sealed and packaged in aluminum-plastic composite film bags, 40° C., 75% RH).

| Time | Character | Water content (%) | Related substance (%) | Content (%) | Average particle size (μm) | Bulk density (g/mL) | Carr index(%) |
|---|---|---|---|---|---|---|---|
| 0 month | White solid | 3.50 | 0.07 | 99.93 | 70.1 | 0.30 | 24 |
| 3 months | White solid | 3.48 | 0.08 | 99.82 | 69.5 | 0.31 | 23 |
| 6 months | White solid | 3.49 | 0.10 | 99.71 | 71.4 | 0.32 | 25 |

Example 4: Preparation of Tablets of Amlodipine Mesylate Monohydrate Through Direct Compression (1) Formulation

| Nos. | Name for the API and excipients | 800,000 tablets |
|---|---|---|
| 1 | Amlodipine mesylate prepared in Example 3 | 5.12 kg |
| 2 | Type 102 microcrystalline cellulose | 108.24 kg |
| 3 | Pregelatinized starch | 46.4 kg |
| 4 | Magnesium stearate | 0.24 kg |
|  | Total | 160 kg |

(2) Preparation

Magnesium stearate, pregelatinized starch, type 102 microcrystalline cellulose and amlodipine mesylate prepared in Example 3 were accurately weighed in the order of excipients before the API and then were placed in clean, sealable stainless-steel barrels respectively. Then, the amlodipine mesylate was passed through 80 mesh firstly following by passing ⅓ of the feed amount of pregelatinized starch through the same mesh. The obtained mixture of amlodipine mesylate and pregelatinized starch was then put into a SBH-1200 Three-Dimensional Oscillating Mixer and mixed for 10 min. Afterwards, the remaining pregelatinized starch was put into the Mixer and mixed for 30 min. ½ of the feed amount of microcrystalline cellulose was put into the Mixer and mixed for 25 min following by putting the remaining microcrystalline cellulose into the Mixer for mixing 35 min. Finally, the magnesium stearate was put into the Mixer and mixed for 10 min to give an intermediate in a form of mixed powder. The intermediate has an angle of repose of 26°, a carr index of 23%, and a bulk density of 0.37 g/mL, as well as good fluidity. The content of the intermediate was determined through HPLC. The intermediate was then compressed by ZP129 Rotary High Speed Tablet Press Machine to produce tablets with following compression parameters: 6.4 mg per tablet (equivalent to 5.0 mg amlodipine), 38 rpm/min and a hardness of 4.0-12.0 kg. The obtained tablets were packaged using an Aluminum Plastic Blister Packaging Machine to give end products of the amlodipine mesylate. During the process of producing the tablets of amlodipine mesylate, smoothly compressing process can be achieved and tablets with small tablet weight variation, smooth appearance, qualifying hardness and friability, and good content uniformity and stability can be obtained. Results are shown in table-4 and table-5.

TABLE 4

Determination results of tablets of amlodipine mesylate

| Tablet weight variation (average tablet weight + RSD %) | Content uniformity (A + 2.2 S) | Content (%) | Total impurities (%) | Dissolution rate (%) | Hardness (kg) | Friability (%) |
|---|---|---|---|---|---|---|
| 199.7 + 0.52 | 4.9 | 99.91 | 0.08 | 98.21 | 7.3 | 0.52 |

TABLE 5

Results of accelerated test (sealed and packaged in aluminum-plastic composite film bags, 40° C., 75% RH).

| Time | Character | Total impurities (%) | Content (%) | Dissolution rate (%) |
|---|---|---|---|---|
| 0 month | White tablet | 0.08 | 99.91 | 98.21 |
| 3 months | White tablet | 0.10 | 99.87 | 98.69 |
| 6 months | White tablet | 0.10 | 99.82 | 98.81 |

Comparative Example 1

Figure 10:
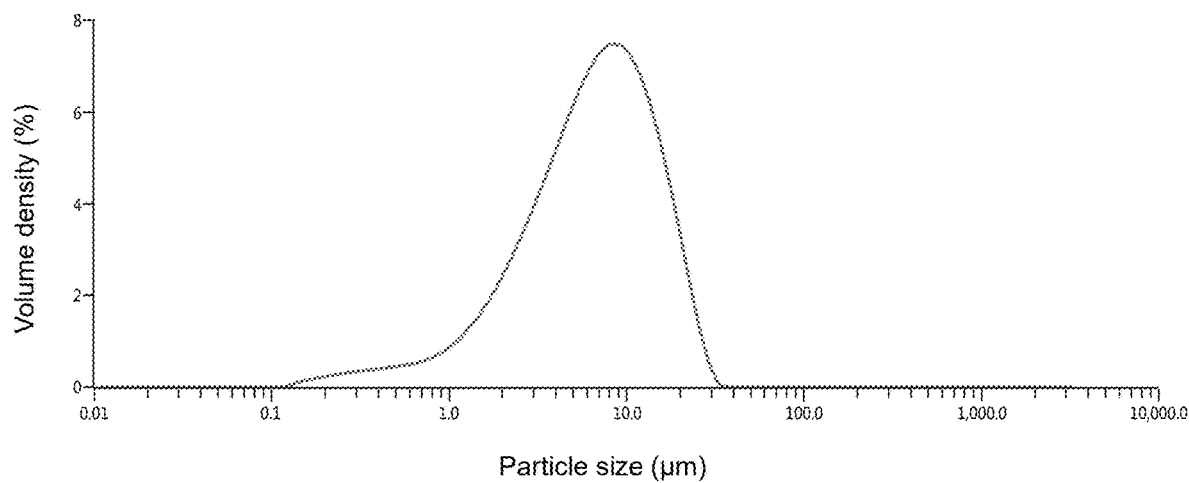
FIG. 10 shows a particle size distribution of the product prepared in comparative example 1.
Figure 11:
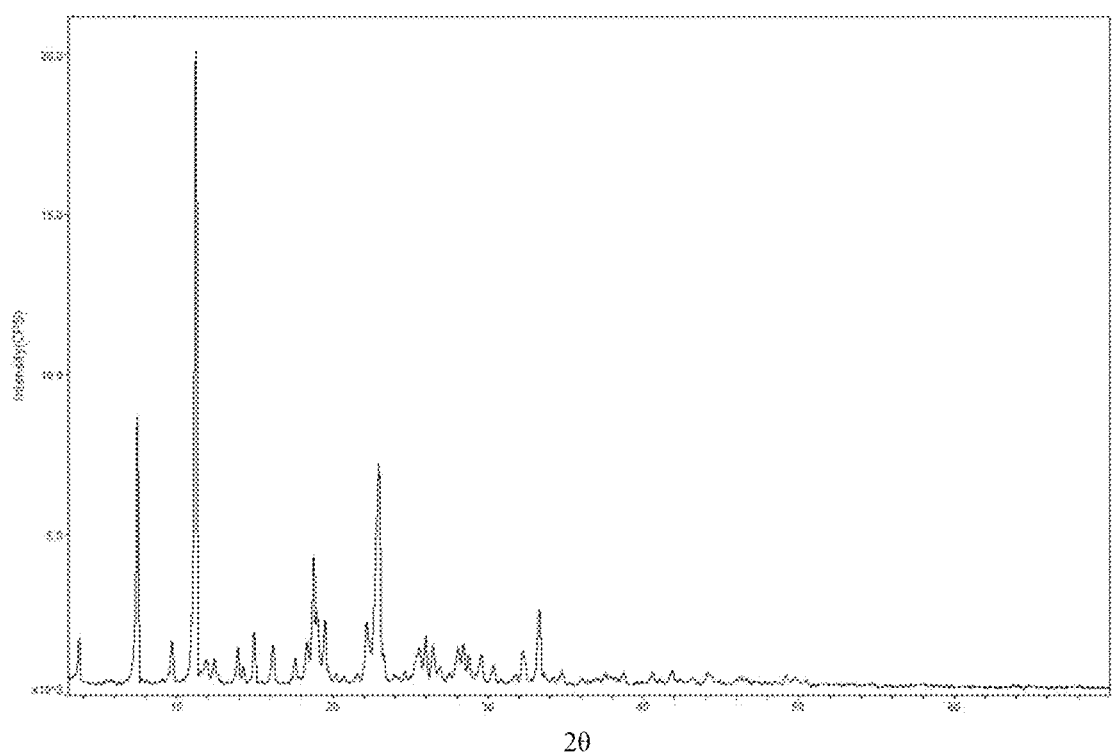
FIG. 11 shows an X-ray powder diffraction spectrum of the product prepared in comparative example 1.
Figure 12:
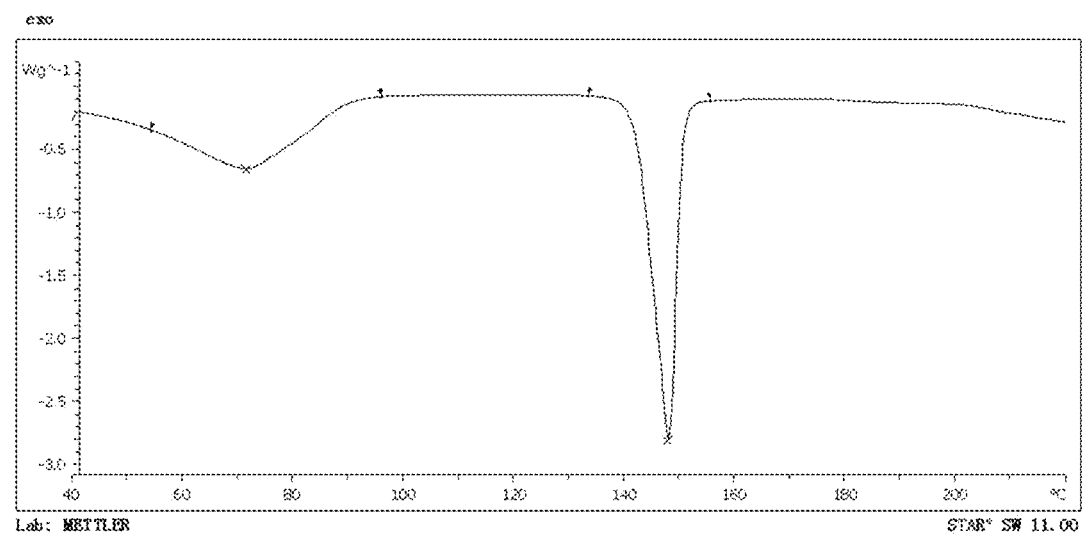
FIG. 12 shows a differential thermal analysis spectrum of the product prepared in comparative example 1.

This comparative example was conduct with reference to the method for preparing amlodipine mesylate monohydrate disclosed by CN1263093A. Specifically, 1000 g of amlodipine free base (2.45 mol) and ethyl acetate (7.0 L) were sequentially added to a 20 L reaction still and then stirred for 15 minutes to dissolve before adding purified water (100 mL) thereto. Subsequently, under a cooling condition with water bath, 282.2 of methanesulfonic acid (2.94 mol, 1.2 eq) was slowly added dropwise through a constant-pressure dropping funnel under stirring, and the dropping rate was controlled at about 1 mL/min. A large number of crystals were precipitated, and an explosive crystallization appeared when about 101 mL of methanesulfonic acid (makes up about 53% of the total amount) was added. The remaining methanesulfonic acid was continued to drop. After completion, the obtained mixture was left at room temperature overnight to precipitate white solid which was then filtered and rinsed with ethyl acetate to obtain white crystals. The obtained crystals were vacuum-dried at a drying temperature of 30° C. for 4 hours to give 1151.4 g white like solid (the product) (yield 90%). The purity of the product determined through HPLC was 99.89%, the water content of the product determined through Karl Fischer method was 3.49% (the theoretical value is 3.44%). The product has a particle size distribution of $D_{10}$: 1.73 μm, $D_{50}$: 6.70 μm and $D_{90}$: 16.4 μm. The particle size distribution of the product was shown in FIG. 10, the X-ray powder diffraction spectrum of the product was shown in FIG. 11, and the differential thermal analysis spectrum of the product was shown in FIG. 12. Furthermore, the obtained product has a carr index of 41%, an angle of repose of 46°, and a bulk density of 0.22 g/mL. It can be seen the particle size distribution of the product is not uniform, and the carr index and the angle of repose of the product indicated that the product has poor fluidity. In addition, the results of stability study showed that the impurities in the product increased quickly, and the color changed obviously (see table-6).

TABLE 6

Results of accelerated test (sealed and packaged in aluminum-plastic composite film bags, 40° C., 75% RH).

| Time | Character | Water content (%) | Related substance (%) | Content (%) | Average particle size (μm) | Bulk density (g/mL) | Carr index (%) |
|---|---|---|---|---|---|---|---|
| 0 month | White like solid | 3.49 | 0.12 | 99.89 | 6.70 | 0.22 | 41 |
| 3 months | Light yellow solid | 3.48 | 0.18 | 99.81 | 5.96 | 0.25 | 42 |
| 6 months | Yellow solid | 3.51 | 0.23 | 99.71 | 6.93 | 0.26 | 43 |

Comparative Example 2

Figure 13:
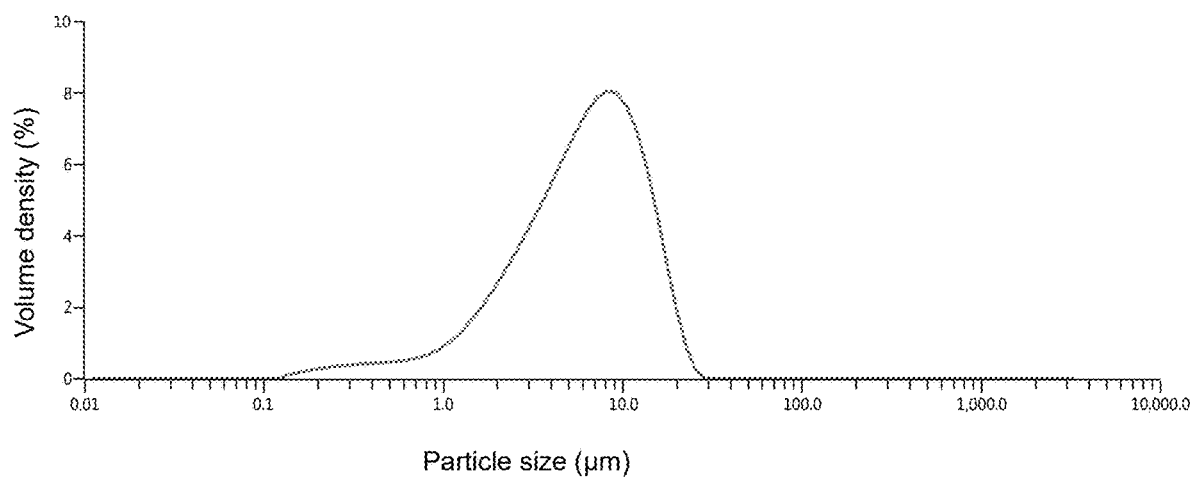
FIG. 13 shows a particle size distribution of the product prepared in comparative example 2.
Figure 14:
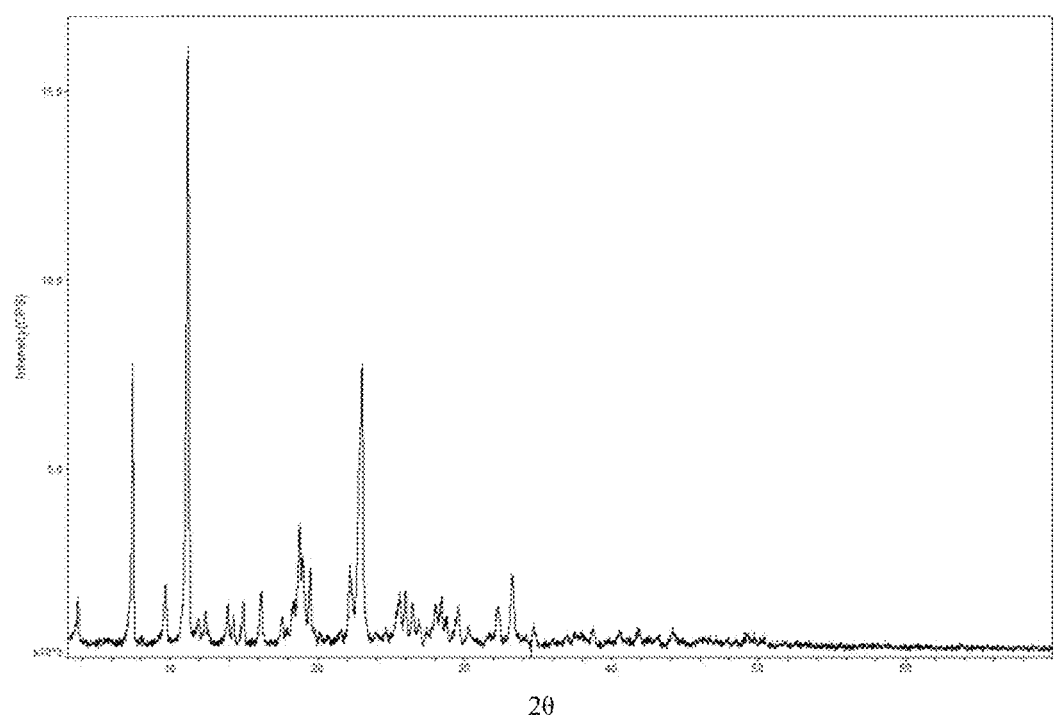
FIG. 14 shows an X-ray powder diffraction spectrum of the product prepared in comparative example 2.
Figure 15:
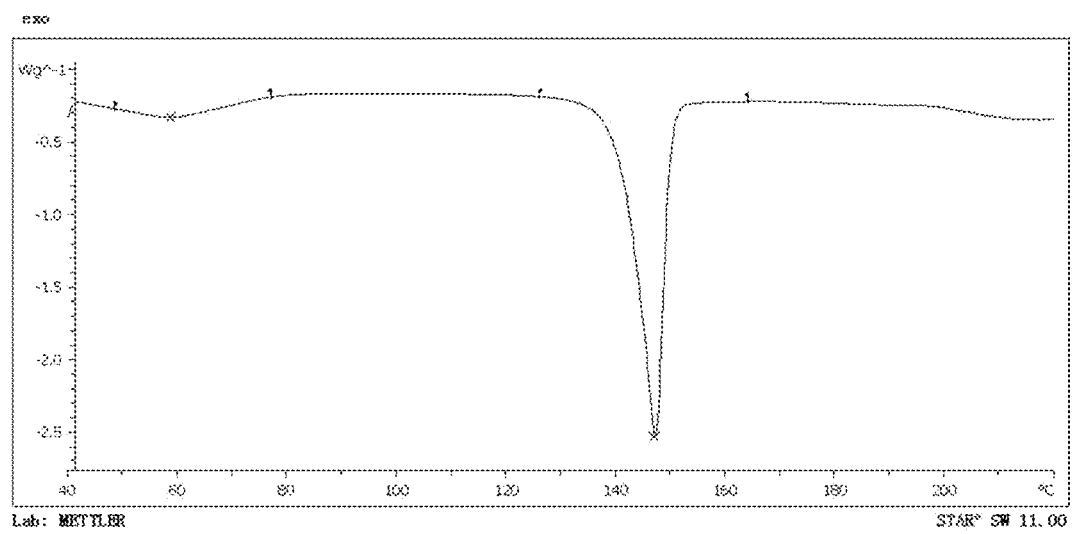
FIG. 15 shows a differential thermal analysis spectrum of the product prepared in comparative example 2.

This comparative example was conduct with reference to the method for preparing amlodipine mesylate monohydrate disclosed by EP1221438A2. Specifically, 100 g amlodipine free base (245.1 mmol) and 577 g of isopropanol were sequentially added to a 2000 mL three-necked flask, stirred for 30 minutes at 30-40° C. under nitrogen atmosphere to dissolve. The obtained solution was filtered, and the filtrate was cooled to 25-30° C. and treated by addition of purified water (12.5 mL). 24.1 g (251.2 mmol, 1.025 eq.) of methanesulfonic acid was then weighted and slowly added dropwise through a constant-pressure dropping funnel under stirring. A large number of crystals were precipitated, and an explosive crystallization appeared when about 9 mL of methanesulfonic acid (makes up about 55% of the total amount) was added. The remaining methanesulfonic acid was continued to drop until complete. The obtained mixture was left at room temperature overnight to precipitate white solid which was then filtered and rinsed with isopropanol to obtain white crystals. The obtained crystals were vacuum-dried at a drying temperature of 40° C. for 48 hours to give 111.3 g white like solid (the product) (yield 87%). The purity of the product determined through HPLC was 99.82%, the water content of the product determined through Karl Fischer method was 3.57% (the theoretical value is 3.44%). The product has a particle size distribution of $D_{10}$: 1.62 μm, $D_{50}$: 6.22 μm and $D_{90}$: 14.1 μm. The particle size distribution of the product was shown in FIG. 13, the X-ray powder diffraction spectrum of the product was shown in FIG. 14, and differential thermal analysis spectrum of the product was shown in FIG. 15. Furthermore, the obtained product has a carr index of 42%, an angle of repose of 45°, and a bulk density of 0.26 g/mL. It can be seen the particle size distribution of the product is not uniform, and the carr index and the angle of repose of the product indicated that the product has poor fluidity. In addition, the results of stability study showed that the impurities in the product increased quickly, and the color changed obviously (see table-7).

TABLE 7

Results of accelerated test (sealed and packaged in aluminum-plastic composite film bags, 40° C., 75% RH).

| Time | Character | Water content (%) | Related substance (%) | Content (%) | Average particle size (μm) | Bulk density (g/mL) | Carr index (%) |
|---|---|---|---|---|---|---|---|
| 0 month | White like solid | 3.57 | 0.11 | 99.82 | 6.22 | 0.26 | 42 |
| 3 months | Light yellow solid | 3.52 | 0.18 | 99.71 | 5.89 | 0.27 | 41 |
| 6 months | Yellow solid | 3.53 | 0.26 | 99.62 | 6.74 | 0.25 | 44 |

Comparative Example 3: Preparation of Tablets of Amlodipine Mesylate Monohydrate Through Direct Compression This comparative example was conduct with reference to the method for preparing tablets of amlodipine mesylate monohydrate disclosed by CN1263093A.

(1) Formulation

| No. | Name for the API and excipients | 100,000 tablets |
|---|---|---|
| 1 | Amlodipine mesylate prepared in comparative example 1 | 0.64 kg |

-continued

| No. | Name for the API and excipients | 100,000 tablets |
|---|---|---|
| 2 | Type 102 microcrystalline cellulose | 13.53 kg |
| 3 | Pregelatinized starch | 5.8 kg |
| 4 | Magnesium stearate | 0.03 kg |
|  | Total | 20 kg |

(2) Preparation

Magnesium stearate, pregelatinized starch, type 102 microcrystalline cellulose and amlodipine mesylate prepared in comparative example 1 were accurately weighed in the order of excipients before the API and then were placed in clean, sealable stainless-steel barrels respectively. Since part of amlodipine mesylate was blocky, it should be passed through 80 mesh firstly following by passing ⅓ of the feed amount of pregelatinized starch through the same mesh. The obtained mixture of amlodipine mesylate and pregelatinized starch was then put into an SBH-1200 Three-Dimensional Oscillating Mixer and mixed for 10 min. Afterwards, the remaining pregelatinized starch was put into the Mixer and mixed for 30 min. ½ of the feed amount of microcrystalline cellulose was put into the Mixer and mixed for 25 min following by putting the remaining microcrystalline cellulose into the Mixer for mixing 35 min. Finally, the magnesium stearate was put into the Mixer and mixed for 10 min to give an intermediate in a form of mixed powder. The intermediate has an angle of repose of 32°, a carr index of 34%, and a bulk density of 0.31 g/mL, as well as slightly worse fluidity.

The content of the intermediate was determined through HPLC. The intermediate was then compressed by ZP129 Rotary High Speed Tablet Press Machine to produce tablets with following compression parameters: 6.4 mg per tablet (equivalent to 5.0 mg amlodipine), 38 rpm/min and a hardness of 4.0-12.0 kg. The obtained tablets were packaged using an Aluminum Plastic Blister Packaging Machine to give end products of the amlodipine mesylate. During the process of producing the tablets of amlodipine mesylate, less smooth compressing process can be observed and tablets with large tablet weight variation, smooth appearance, qualifying hardness and friability and poor content uniformity can be obtained. In addition, the results of stability study showed that the impurities in the tablets increased quickly and the color changed obviously (see table-8 and table-9).

TABLE 8

Determination results of tablets of amlodipine mesylate

| Tablet weight variation (average tablet weight + RSD %) | Content uniformity (A + 2.2 S) | Content (%) | Total impurities (%) | Dissolution rate (%) | Hardness (kg) | Friability (%) |
| --- | --- | --- | --- | --- | --- | --- |
| 198.6 + 1.89 | 12.1 | 99.82 | 0.13 | 97.25 | 7.1 | 0.62 |

TABLE 9

Results of accelerated test (sealed and packaged in aluminum-plastic composite film bags, 40° C., 75% RH).

| Time | Character | Total impurities (%) | Content (%) | Dissolution rate (%) |
| --- | --- | --- | --- | --- |
| 0 month | White tablet | 0.13 | 99.82 | 97.25 |
| 3 months | White like tablet | 0.21 | 99.71 | 98.52 |
| 6 months | White like tablet | 0.28 | 99.63 | 97.89 |

What is claimed is:

1. A method for preparing an amlodipine mesylate monohydrate, wherein said method comprises following steps: dissolving an amlodipine free base in a water-containing organic solvent and adding methanesulfonic acid dropwise under low temperature condition to give a saturated solution, stirring and adding a seed crystal of amlodipine mesylate monohydrate thereto, adding methanesulfonic acid dropwise continuously under stirring to give crystals, growing the crystals, centrifuging, washing and vacuum drying before obtaining;

wherein the organic solvent is one or more selected from the group consisting of ethyl acetate, acetone, acetonitrile and isopropanol;

a molar ratio between the water contained in the organic solvent and the amlodipine free base is 1.0-10.0;

a ratio (m:v) between the amlodipine free base and the organic solvent is 1:3-1:15;

a total amount of methanesulfonic acid added is 0.9 to 2.0 equivalents of the amlodipine free base;

an amount of methanesulfonic acid added before adding the seed crystal of amlodipine mesylate monohydrate is 10%-30% (mass percentage) of the total amount of methanesulfonic acid added;

the low temperature condition is 0° C.-30° C.;

the growing of the crystals is conducted under a temperature of −10° C.-30° C.;

the growing of the crystals is conducted for 0.5-24 hours;

a stirring rate utilized before the adding of the seed crystal is 150-200 rpm/min, and a stirring rate utilized after the adding of the seed crystal is 100 rpm/min-60 rpm/min; and the monohydrate is in crystal form, the crystal has a particle size distribution of D10: 20-40 µm, D50: 55-85

μm, D90: 95-140 μm, a carr index of 10-25%, an angle of repose (α) of 15-35°, a bulk density of 0.25-0.45 g/mL, and a purity of more than 99.5%.

2. The method according to claim 1, wherein, the organic solvent is ethyl acetate or acetone.

3. The method according to claim 1, wherein, the added seed crystal of amlodipine mesylate monohydrate is crystal form B.

4. The method according to claim 1, wherein, the low temperature condition is 0° C.-25° C.;
the growing of the crystals is conducted under a temperature of 0° C.-10° C.; and
the growing of the crystals is conducted for 2-4 hours.

5. The method according to claim 1, wherein,
the vacuum drying is conducted under a vacuum degree of −0.04 MPa to −0.07 MPa and a drying temperature of 20° C.-45° C.

6. The method according to claim 1, wherein, said amlodipine free base can be a solid raw material or a solution of amlodipine free base without separation.

7. The method according to claim 1, wherein, a molar ratio between the water contained in the organic solvent and the amlodipine free base is 1.0-5.0.

8. The method according to claim 1, wherein, the ratio (m:v) between the amlodipine free base and the organic solvent is 1:4-1:10.

9. The method according to claim 1, wherein, the ratio (m:v) between the amlodipine free base and the organic solvent is 1:4-1:6.

10. The method according to claim 1, wherein, an amount of the seed crystal of amlodipine mesylate monohydrate is 0.5%-10% by weight of the amlodipine free base.

11. The method according to claim 1, wherein, an amount of the seed crystal of amlodipine mesylate monohydrate is 1% by weight of the amlodipine free base.

12. The method according to claim 1, wherein, the total amount of methanesulfonic acid added is 0.9 to 1.2 equivalents of amlodipine free base.

13. The method according to claim 1, wherein, the amount of methanesulfonic acid added before adding the seed crystal of amlodipine mesylate monohydrate is 15%-25% (mass percentage) of the total amount of methanesulfonic acid added.

14. The method according to claim 1, wherein, the growing of the crystals is conducted under a temperature of 0° C.-5° C.

15. The method according to claim 1, wherein, the vacuum drying is conducted under a vacuum degree of −0.04 MPa to −0.07 MPa and at a drying temperature of 20° C.-30° C.

* * * * *